United States Patent
Koike et al.

(10) Patent No.: US 9,816,587 B2
(45) Date of Patent: Nov. 14, 2017

(54) GEARED MOTOR

(71) Applicant: Nidec Copal Corporation, Tokyo (JP)

(72) Inventors: Shinji Koike, Saitama (JP); Kazuo Tanabe, Saitama (JP)

(73) Assignee: NIDEC COPAL CORPORATION, Tokyo (JP)

(*) Notice: Subject to any disclaimer, the term of this patent is extended or adjusted under 35 U.S.C. 154(b) by 20 days.

(21) Appl. No.: 14/749,913

(22) Filed: Jun. 25, 2015

(65) Prior Publication Data
US 2015/0377323 A1   Dec. 31, 2015

(30) Foreign Application Priority Data
Jun. 30, 2014 (JP) .................... 2014-135268

(51) Int. Cl.
| F16H 1/46 | (2006.01) |
| F16H 55/17 | (2006.01) |
| H02K 7/116 | (2006.01) |
| F16H 57/00 | (2012.01) |
| F16H 55/08 | (2006.01) |
| F16H 3/64 | (2006.01) |
| H04M 1/02 | (2006.01) |

(52) U.S. Cl.
CPC .......... F16H 1/46 (2013.01); F16H 57/0006 (2013.01); H02K 7/116 (2013.01); *F16H 3/64* (2013.01); *F16H 2055/086* (2013.01); *F16H 2055/176* (2013.01); *H04M 1/0264* (2013.01); *H04M 2250/20* (2013.01)

(58) Field of Classification Search
None
See application file for complete search history.

(56) References Cited

U.S. PATENT DOCUMENTS

| 5,429,558 A * | 7/1995 | Lagarde | F16H 1/2836 |
| | | | 475/331 |
| 5,679,089 A * | 10/1997 | Levedahl | F16H 1/46 |
| | | | 475/330 |
| 5,830,098 A * | 11/1998 | Kimes | F16H 1/46 |
| | | | 475/159 |
| 8,961,362 B2 * | 2/2015 | Fox | F03D 11/02 |
| | | | 475/330 |
| 2008/0236908 A1 * | 10/2008 | Cooper | B60K 17/046 |
| | | | 180/65.1 |
| 2009/0031839 A1 * | 2/2009 | Shimizu | F16H 1/46 |
| | | | 74/421 A |
| 2011/0293328 A1 * | 12/2011 | Matsuda | B41J 23/025 |
| | | | 399/167 |
| 2013/0269305 A1 * | 10/2013 | Wang | A01D 34/00 |
| | | | 56/14.7 |
| 2014/0227084 A1 * | 8/2014 | Sheridan | F02C 7/36 |
| | | | 415/122.1 |

FOREIGN PATENT DOCUMENTS

JP   2001-173733 A   6/2001

* cited by examiner

*Primary Examiner* — Robert A Siconolfi
*Assistant Examiner* — Ryan Dodd
(74) *Attorney, Agent, or Firm* — Troutman Sanders LLP

(57) ABSTRACT

A geared motor includes a gear mechanism portion that meshes with a rotational shaft provided within a main motor unit. The gear mechanism portion has a multistage planetary gear reducing mechanism. The multistage planetary gear reducing mechanism includes a first stage gear formed helically and a final stage gear formed with spur teeth.

4 Claims, 3 Drawing Sheets

GEARED MOTOR

CROSS REFERENCE TO RELATED APPLICATION

This application claims priority under 35 U.S.C. §119 to Japanese Patent Application No. 2014-135268, filed on Jun. 30, 2014, the entire content of which being hereby incorporated herein by reference.

FIELD OF TECHNOLOGY

The present invention relates to a geared motor that is suitable to fields that require small precision motors such as AV instruments and mobile information terminal devices, such as smart phones.

BACKGROUND

Conventionally, for planetary gear reducing mechanisms that are used in geared motors, those wherein all of the gears are structured from spur teeth have been known generally, but there is a tendency for the operating noise of such geared motors to be loud. On the other hand, a geared motor wherein all of the gears are structured helically is known. See, for example, Japanese Unexamined Patent Application Publication No. 2001-173733.

However, when a structure wherein all of the gears are helical is used for planetary gear reducing mechanism for a geared motor, even though the operating noise will be quiet, the gears are difficult to assemble, increasing the amount of labor in assembly. Given this, the present invention is to provide a geared motor wherein the operating noise that is produced by the planetary gear reducing mechanism is reduced, and wherein the increase in the amount of labor in assembly is suppressed because the gear assembly is not difficult.

SUMMARY

The present invention is a geared motor 1 having a rotational shaft 3 that is provided in a motor main unit A, and a gear mechanism portion B. The gear mechanism portion B has a multistage planetary gear reducing mechanism, where a first stage of the planetary gear reducing mechanism is structured from a star-shaped planetary gear reducing mechanism, where gears 8, 10, and 11 thereof are formed helically, and a final stage of the planetary gear reducing mechanism is structured as a planetary-type planetary gear reducing mechanism, and gears 21, 22, and 17 thereof are formed as spur teeth.

The present invention makes it possible to use a simple structure to successfully quiet the geared motor.

BRIEF DESCRIPTIONS OF THE DRAWINGS

DETAILED DESCRIPTION

Figure 1:
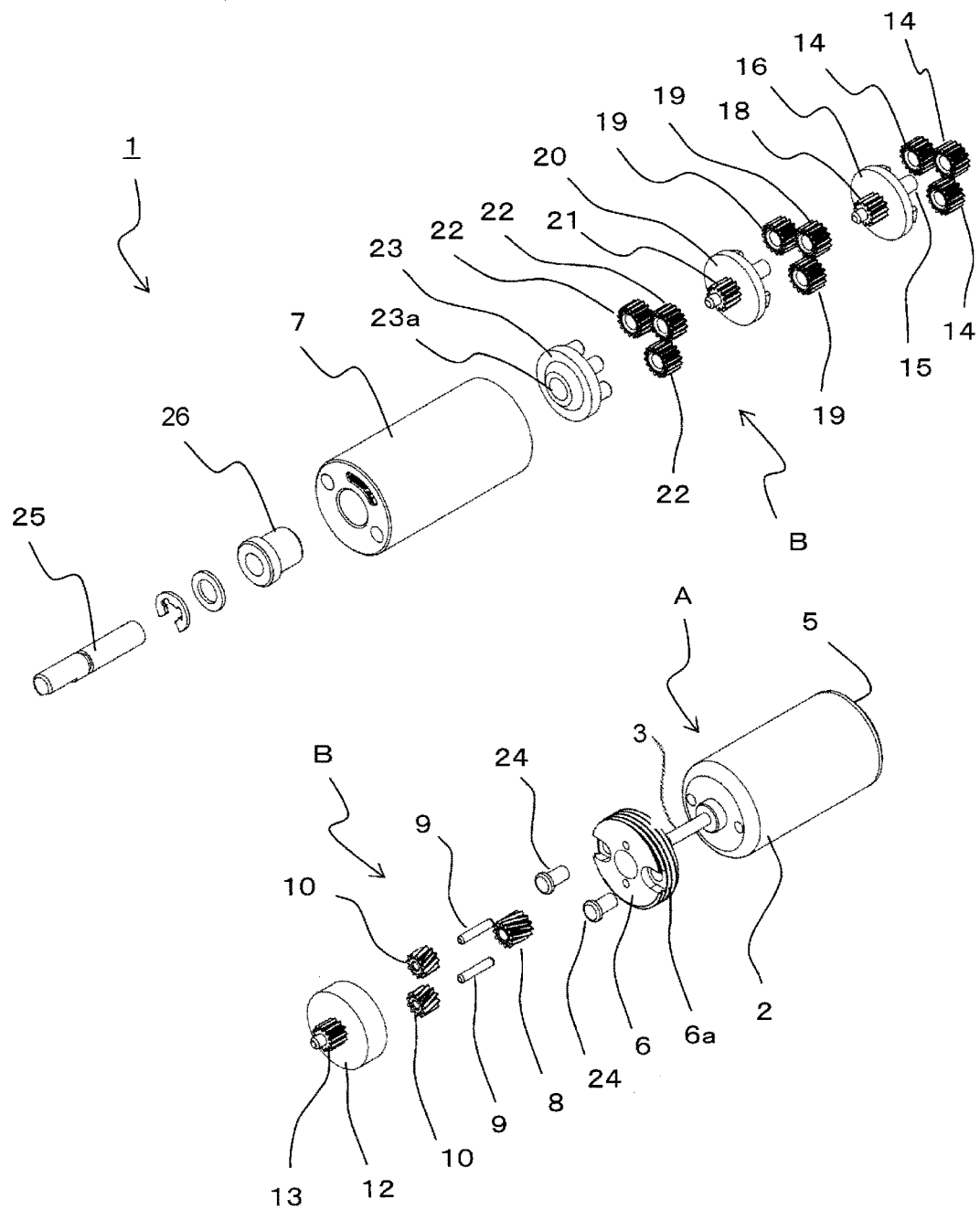
FIG. 1 is an assembly perspective diagram illustrating an example of a geared motor according to the present invention.
Figure 2:
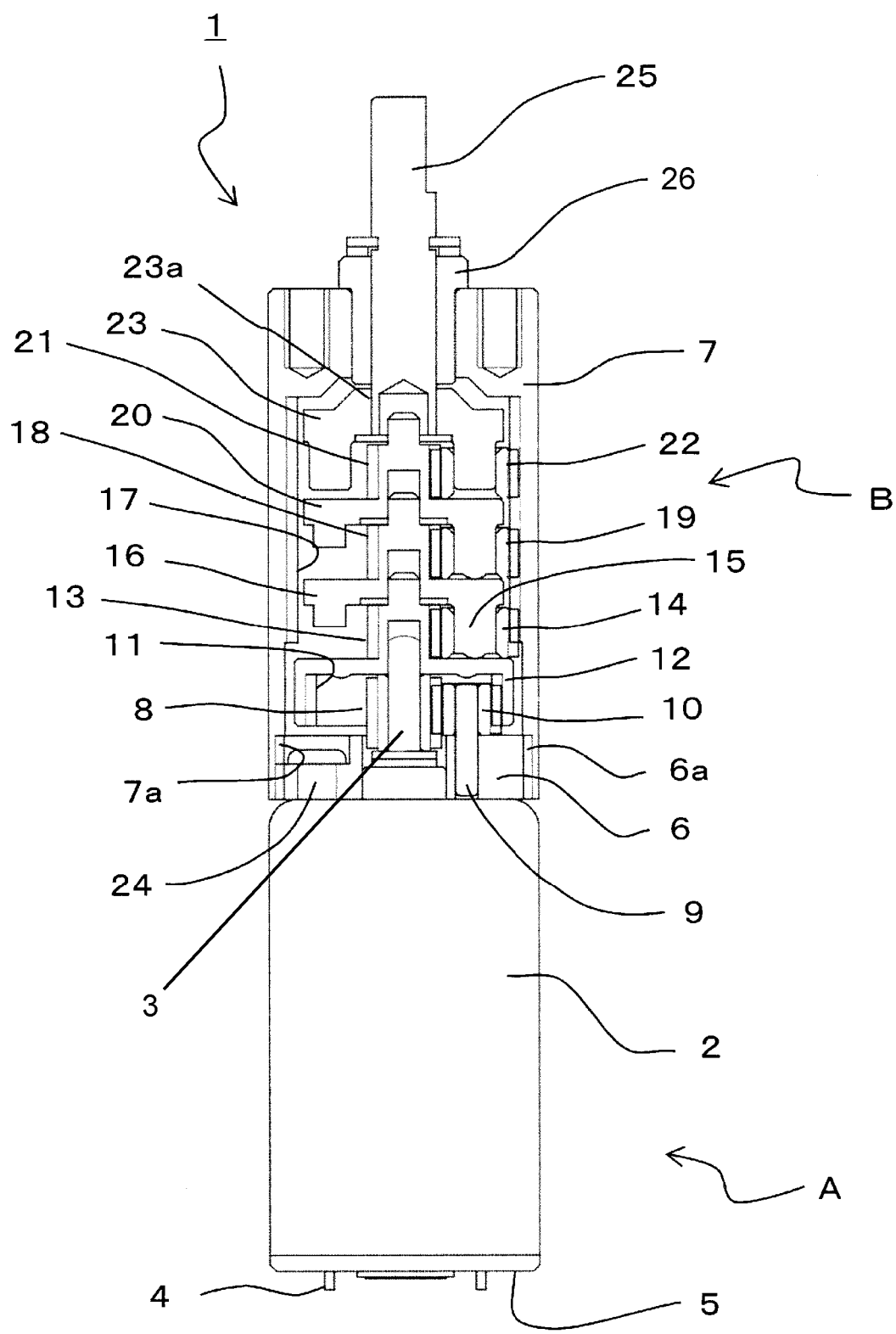
FIG. 2 is a cross-sectional diagram of the geared motor illustrated in FIG. 1.

As illustrated in FIG. 1 and FIG. 2, the geared motor 1 is provided with a motor main unit A that has a cored motor and a motor case (a body portion) 2 of a tubular shape, and achieves miniaturization. A stationary element, made from a permanent magnet that has north and south poles is secured to an inner wall surface of the motor case 2, where a rotor, wherein a coil is wound onto the core, is contained with in the motor case 2. A rotational shaft 3, supported by a bearing, is secured at the center of the rotor, where a tip end portion of the rotational shaft 3 extends so as to pass through a front end part of the motor case 2. Moreover, a commutator is secured to a back end of the rotational shaft 3 within the rotor case 2, where a pair of brushes makes sliding contact with the commutator. A flat terminal 4 is connected to the base end of each of the brushes, and the back end sides of each of the terminals 4 protrude from a bracket 5 that is secured to the back end of the motor case 2.

Moreover, a flange 6 is secured through screws 24 to the motor case 2, where two shafts 9, which extend in parallel to the rotational shaft 3, are secured to the flange 6. Furthermore, a threaded portion 6a, wherein threads are cut, is provided on the outer peripheral side of the flange 6. A gearbox 7 is formed in a cylinder that is closed on the bottom, having one end that is open, and a threaded portion 7a, wherein threads are cut, is provided on the inner peripheral side of the opening portion of the gearbox 7. Given this, the threaded portion 6a of the flange 6 and the threaded portion 7a of the gearbox 7 are screwed together, to secure the gearbox 7 to the flange 6. The rotational shaft 3 protrudes into the gearbox 7, and a driving geared 8 that is provided on this rotational shaft 3 meshes with a gear mechanism portion B that is contained with in the gearbox 6.

A power shaft 25 is linked to the gear mechanism portion B, where the power shaft 25 protrudes from the tip end of the gearbox 7. The rotation of the rotational shaft 3 is reduced, through the gear mechanism portion B, to be outputted from the power shaft 25.

The gear mechanism portion B will be explained in detail next.

A driving gear 8 of the rotational shaft 3 is formed helically, where helical gears 10 and 10, which are born rotatably on the two respective shafts 9, mesh with this driving gear 8. A carrier 12 is born rotatably on the rotational shaft 3, where the two helical gears 10 mesh with a helical inner gear 11 that is formed on the carrier 12. A star-shaped planetary gear reducing mechanism is structured from the driving gear 8, the two helical gears 10, and the carrier 12 that is provided with the inner gear 11.

A spur tooth sun gear 13 is formed coaxially with the rotational shaft 3 on the carrier 12, where three spur tooth planetary gears 14 mesh with this sun gear 13. The planetary gears 14 are attached rotatably to the carrier 16, and mesh with the spur tooth inner gear 17 that is formed on the inner periphery of the gearbox 6. The carrier 16 is born rotatably on a shaft portion 12a that is provided at the front end of the sun gear 13 of the carrier 12. Three shafts 15, that extend in parallel to the rotational shaft 3, are formed integrally with the carrier 16, where planetary gears 14 are each born rotatably on the three shafts 15. A first stage planetary-type planetary gear reducing mechanism is structured from the sun gear, the three spur tooth planetary gears 14, the carrier 16, and the inner gear 17.

A subsequent stage (second stage) sun gear 18 is formed coaxially with the rotational shaft 3 on the carrier 16, where this sun gear 18 meshes with a planetary gear 19. Moreover, planetary-type planetary gear reducing mechanisms of a second stage and of a third stage are provided, structured identically to that of the first stage. Because the first-stage, second-stage, and third-stage planetary gear reducing mechanisms each have identical structures, detailed explanations thereof will be omitted. Note that the third planetary gear reducing mechanism is the final stage, and is structured from a sun gear 21, three planetary gears 22, a carrier 23, and the inner gear 17. While the planetary-type planetary gear reducing mechanism has a three-stage structure in the present example, there is no limitation to the planetary-type planetary gear reducing mechanism to being of three stages, but rather the number of stages can be changed as appropriate depending on the required reduction ratio.

In the carrier 23 on the power shaft 25 side, which is the final stage, instead of a sun gear, the power shaft 25 is secured. The carrier 23 is formed with a shaft attaching portion, which is a recessed shape or a hole, that is coaxial with the rotational shaft 3, where the base end of the power shaft 25 is secured in this shaft attaching portion 23a. The power shaft 25 is born by a radial bearing 26 that is secured to the bottom of the gearbox 7, where the other end of the power shaft 25 protrudes from the gearbox 7.

In this way, in the gear mechanism portion B, of the multiple stages of planetary gear reducing mechanisms, the gears 8, 10, and 11 of the first stage of the planetary gear reducing mechanism are formed helically, and the gears 21, 22, and 17 of the final stage of the planetary gear reducing mechanism are formed from spur teeth, and thus it is possible to achieve a geared motor wherein the assembly of the gear mechanism portion is easy and wherein the operating noise is quieted.

That is, the individual gears 21 and 22 of the final stage rotate the most slowly within the gear mechanism portion B, where there would be little quieting effect to having the gears that are rotating slowly be helical. On the other hand, having each of the gears (the driving gear 8 and the helical gears 10 that mesh with the driving gear 8) in the first stage, which rotates the most quickly in the gear mechanism portion B, be helical increases the quieting effect. Consequently, having the gears 21 and 22, which rotate slowly, for which no remarkable effect can be anticipated in the quieting effects, be spur gears, makes it possible to achieve both ease in gear assembly and achieve quieting. As a result, quieting is possible through a simple structure.

Figure 3:
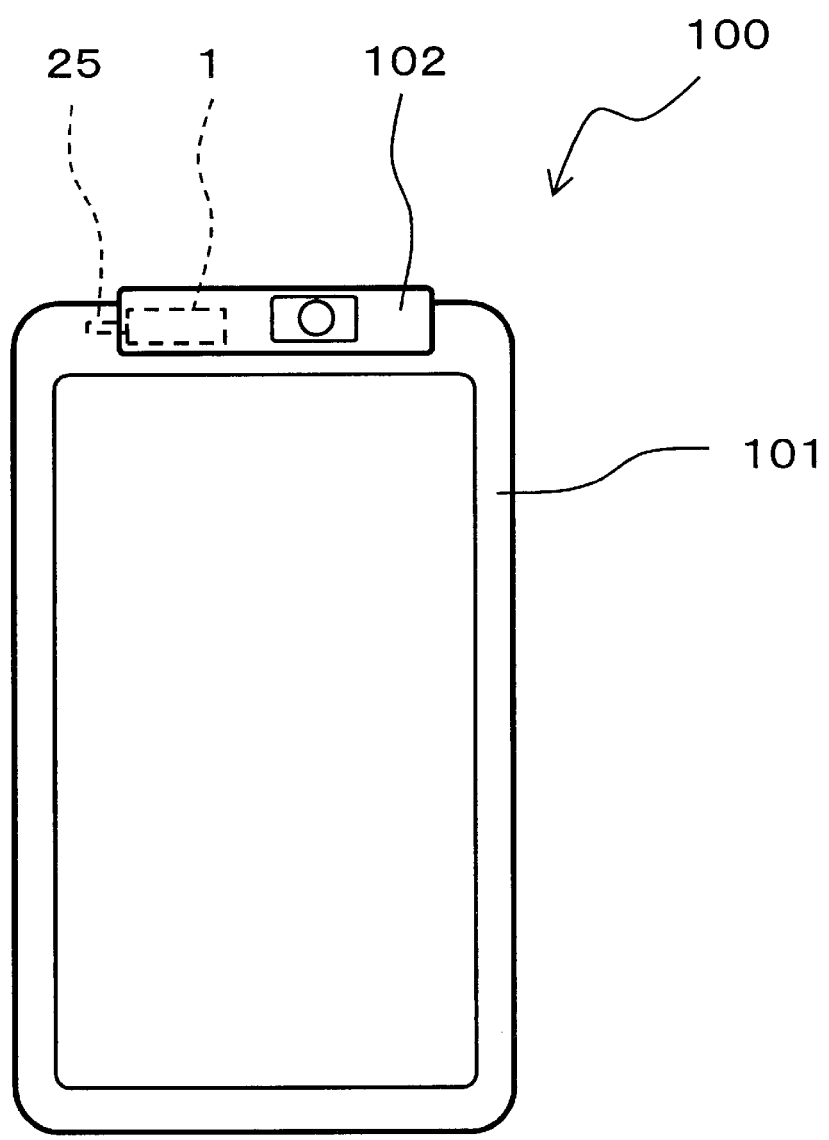
FIG. 3 is an explanatory diagram illustrating a mobile information terminal device provided with the geared motor according to the example illustrated in FIG. 1.

As illustrated in FIG. 3, the geared motor 1 is used in a mobile information terminal device, for example, a smart phone 100, where a camera portion 102 (an actuating portion) is provided in the smart phone 100, where the camera portion 102 is able to rotate relative to a smart phone main unit portion 101. The geared motor 1 is provided within this camera portion 102, where the power shaft 25 of the geared motor 1 extends from the camera portion 102 into the smart phone main unit portion 101. The case 2 of the geared motor 1 or the gearbox 7 is fixed to the camera portion 102. The power shaft 25 engages with the smart phone main unit portion 101, where the geared motor 1 is driven to cause the camera portion 102 to be rotated by the power shaft 25 of the geared motor 1, to enable imaging at a variety of angles. Note that the geared motor 1 may be provided within the smart phone main unit portion 101 instead. Moreover, the actuating portion that actuates the geared motor 1 may instead be an openable/closable cover portion (actuating portion) of the smart phone 100. This makes it possible to open/close (rotatably actuate) the opening/closing cover portion of the geared motor 1.

The invention claimed is:

1. A geared motor assembly comprising:
a gear mechanism that meshes with a rotational shaft which protrudes from a main motor unit, wherein
the gear mechanism comprises a multistage planetary gear reducing mechanism which comprises:
a first stage comprising:
a central axis of rotation;
a carrier comprising an internal gear having a first diameter and an external gear having a second diameter; and
helical planetary gears, each comprising a planetary gear axis of rotation, wherein:
each planetary gear rotates relative to its corresponding axis of rotation; and
each planetary gear axis of rotation is fixed relative to the central axis of rotation;
each planetary gear meshes with the internal gear of the carrier; and
a final stage comprising a spur gear.

2. The geared motor assembly as set forth in claim 1, wherein the final stage of the multistage planetary gear reducing mechanism comprises:
a sun gear comprising a central axis of rotation; and
planetary gears each comprising a planetary gear axis of rotation, where:
each planetary gear rotates relative to its corresponding axis of rotation; and
each planetary gear axis of rotation revolves around the central axis of rotation.

3. The geared motor assembly as set forth in claim 1, comprising:
a gearbox that contains the gear mechanism portion;
a flange, attached to the main motor unit, to which the gearbox is fixed; and
a shaft, fixed to the flange, which rotatably supports and positions the first stage.

4. A mobile information terminal device comprising:
a geared motor assembly; and
an actuating portion that is actuated by the geared motor, wherein
the geared motor assembly comprises:
a gear mechanism that meshes with a rotational shaft which protrudes from a main motor unit, wherein
the gear mechanism comprises a multistage planetary gear reducing mechanism which comprises:
a first stage comprising:
a central axis of rotation;
a carrier comprising an internal gear having a first diameter and an external gear having a second diameter; and
helical planetary gears, each comprising a planetary gear axis of rotation, wherein:
each planetary gear rotates relative to its corresponding axis of rotation; and
each planetary gear axis of rotation is fixed relative to the central axis of rotation;
each planetary gear meshes with the internal gear of the carrier; and
a final stage comprising a spur gear.

* * * * *